(12) United States Patent
Xu et al.

(10) Patent No.: US 8,498,846 B2
(45) Date of Patent: Jul. 30, 2013

(54) JOINT-AWARE MANIPULATION OF DEFORMABLE MODELS

(75) Inventors: Weiwei Xu, Beijing (CN); Kangkang Yin, Singapore (SG); Baining Guo, Beijing (CN); Jun Wang, Hefei (CN); Kun Zhou, Hangzhou (CN); Michiel van de Panne, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 12/712,790

(22) Filed: Feb. 25, 2010

(65) Prior Publication Data

US 2011/0208492 A1  Aug. 25, 2011

(51) Int. Cl.
*G06G 7/48* (2006.01)
*G06F 17/10* (2006.01)
*G06G 7/68* (2006.01)
*G06G 7/60* (2006.01)

(52) U.S. Cl.
USPC .................................................. 703/6; 703/2

(58) Field of Classification Search
None
See application file for complete search history.

(56) References Cited

U.S. PATENT DOCUMENTS

| | | |
|---|---|---|
| 2007/0211067 A1 | 9/2007 | Hunter |
| 2008/0043021 A1 | 2/2008 | Huang et al. |
| 2008/0180448 A1 | 7/2008 | Anguelov et al. |
| 2008/0304744 A1 | 12/2008 | Peters et al. |
| 2008/0309664 A1 | 12/2008 | Zhou et al. |
| 2009/0251462 A1 | 10/2009 | Kaytis et al. |
| 2010/0033488 A1 | 2/2010 | Zhou et al. |

OTHER PUBLICATIONS

Xu et al. "Joint-aware Manipulation of Deformable Models", ACM Transactions on Graphics, vol. 28, No. 3, Article 35, Aug. 2009, 9 pages.*
Botsch et al. "PriMo: Coupled Prisms for Intuitive Surface Modeling", 2006, Eurographics Symposium on Geometry Processing, 10 pages.*
Der et al. "Inverse Kinematics for Reduced Deformable Models", 2006, ACM, pp. 1174-1179.*
Rhee et al. "Real-Time Weighted Pose-Space Deformation on the GPU", 2006, Eurographics, vol. 25, No. 3, 10 pages.*
Au, et al., "Skeleton Extraction by Mesh Contraction", ACM, International Conference on Computer Graphics and Interactive Techniques ACM SIGGRAPH 2008 Papers, Session: Shape Analysis, 2008, Article No. 44, 10 pgs.
Baran, et al., "Automatic Rigging and Animation of 3D Characters", In the Proceedings of the ACM SIGGRAPH 2007, ACM Transactions on Graphics, Session: Articulation, Jul. 2007, vol. 26, Issue 3, Article No. 72, 8 pgs.
Botsch, et al., "Adaptive Space Deformations Based on Rigid Cells", Retrieved on May 27, 2010 at <<http://cg.www.techfak.uni-bielefeld.de/publications/papers/eg07-space-primo_slides.pdf>> 41 pgs. (Computer Graphics Forum, Oct. 12, 2007, vol. 26, Issue 3, pp. 339-347).

(Continued)

*Primary Examiner* — Suzanne Lo
(74) *Attorney, Agent, or Firm* — Lee & Hayes, PLLC (57) ABSTRACT

This disclosure describes a joint-aware deformation framework that supports the direct manipulation of an arbitrary mix of rigid and deformable components. The deformation framework may include at least a joint-analysis and a joint-aware deformation enabling a more realistic deformation of a joint-aware model.

21 Claims, 11 Drawing Sheets

OTHER PUBLICATIONS

Botsch, et al., "On Linear Variational Surface Deformation Methods", Retrieved on May 27, 2010 at <<http://citeseerx.ist.psu.edu/viewdoc/download;jsessionid=860C666EAEE13C22C8E26CD160DA1C5B?doi=10.1.1.83.9299&rep=rep1&type=pdf>> 18 pgs. (In IEEE Transactions on Visualization and Computer Graphics, 2008, vol. 14, Issue 1, pp. 213-230).

Botsch, et al., "PriMo: Coupled Prisms for Intuitive Surface Modeling", In the Proceedings of the Fourth Eurographics Symposium on Geometry Processing, ACM International Conference Proceeding Series, Session: Surface Modeling, 2006, vol. 256, pp. 11-20.

Chiaverini et al., "Review of the Damped Least-Squares Inverse Kinematics with Experiments on an Industrial Robot Manipulator", In the IEEE Transactions on Control Systems Technology, 1994, vol. 2, Issue 2, pp. 123-134.

Der, et al., "Inverse Kinematics for Reduced Deformable Models", In the Proceedings of the International Conference on Computer Graphics and Interactive Techniques, ACM SIGGRAPH 2006 Papers, Session: Animation, 2006, pp. 1174-1179.

Duriez, et al., "Contact Skinning", ACM Press, In Eurographics, 2008, pp. 313-320 (4 pgs.) Available at <<http://citeseerxist.psu.edu/viewdoc/download;jsessionid=76C803983810DECE21E8EEDEC3554FD9?doi=10.1.1.153.3843&rep=rep1&type=pdf>>.

Faloutsos, et al., "Dynamic Animation Synthesis with Free-Form Deformations", In IEEE Transactions on Visualization and Computer Graphics, Jul.-Sep. 1997, vol. 3, No. 3, pp. 201-214, Available at <<http://142.103.6.5/~van/papers/1997-tvcg-ffd.pdf>>.

Gain, et al., "A Survey of Spatial Deformation From a User-Centered Perspective", ACM Transactions on Graphics, 2008, vol. 27, Issue 4, Article No. 107, 21 pgs.

Galoppo, et al., "Soft Articulated Characters With Fast Contact Handling", In the Proceedings of Eurographics 2007, Computer Graphics Forum, vol. 26, No. 3, 10 pgs.

Gelfand, et al., "Shape Segmentation Using Local Slippage Analysis", ACM International Conference Proceeding Series, vol. 71, In the Proceedings of the 2004 Eurographics/ACM SIGGRAPH Symposium on Geometry Processing, Jul. 2004, Session 7, pp. 214-223 (10 pgs.).

Harrison, et al., "Obscuring Length Changes During Animated Motion", ACM, In the Proceedings of the International Conference on Computer Graphics and Interactive Techniques, ACM SIGGRAPH 2004 Papers, Session: Shape & Motion, pp. 569-573 (5 pgs.).

Huang, et al., "Subspace Gradient Domain Mesh Deformation", ACM Transactions on Graphics, vol. 25, Issue 3, Proceedings of the ACM SIGGRAPH 2006, Session: Shape Deformation, pp. 1126-1134 (9 pgs.).

James, et al., "Skinning Mesh Animations", In the Proceedings of the International Conference on Computer Graphics and Interactive Techniques, ACM SIGGRAPH 2005 Papers, Session: Skin & Faces, pp. 399-407 (9 pgs.).

Katz, et al., "Hierarchical Mesh Decomposition Using Fuzzy Clustering and Cuts", In the Proceedings of the International Conference on Computer Graphics and Interactive Techniques, ACM SIGGRAPH 2003 Papers, Session: Computation on GPUs, pp. 954-961 (8 pgs.).

Kaufmann, et al., "Flexible Simulation of Deformable Models Using Discontinuous Galerkin FEM", Academic Press Professional Inc., Journal of Graphical Models, vol. 71, Issue 4, Jul. 2009, Special Issue of ACM SIGGRAPH/Eurographics Symposium on Computer Animation 2008, pp. 153-167.

Kobbelt, et al., "Interactive Multi-Resolution Modeling on Arbitrary Meshes", ACM, In the Proceedings of the 25th Annual Conference on Computer Graphics and Interactive Techniques, 1998, pp. 105-114 (10 pgs.).

Kraevoy, et al., "Non-Homogeneous Resizing of Complex Models", ACM Transactions on Graphics, vol. 27, Issue 5, Dec. 2008, In the Proceedings of ACM SIGGRAPH Asia 2008, Session: Shape Modelling, Article 111, 9 pgs.

Lasseter, "Principles of Traditional Animation Applied to 3D Computer Animation", ACM SIGGRAPH Computer Graphics, Jul. 1987, vol. 21, Issue 4, pp. 35-44.

Lewis, et al., "Pose Space Deformation: A Unified Approach to Shape Interpolation and Skeleton-Driven Deformation", ACM Press/Addison-Wesley Publishing Co., In the Proceedings of the 27th Annual Conference on Computer Graphics and Interactive Techniques, 2000, pp. 165-172 (8 pgs.).

Li, et al., "Automated Generation of Interactive 3D Exploded View Diagrams", ACM Transactions on Graphics, vol. 27, Issue 3, Aug. 2008, In the Proceedings of the ACM SIGGRAPH 2008, Session: Procedural Modeling & Design, Article No. 101, 7 pgs.

Lipman, et al., Linear Rotation-Invariant Coordinates for Meshes (Slide Presentation), Retrieved on May 27, 2010 at <<http://graphics.stanford.edu/courses/cs468-05-fall/slides/sid_rotation_invariant_meshes_fall_05.pdf>> ACM SIGGRAPH 2005, 21 pgs.

Lipman, et al., "Linear Rotation-Invariant Coordinates for Meshes", ACM Transactions on Graphics, vol. 24, Issue 3, Jul. 2005, In the Proceedings of ACM SIGGRAPH 2005, Session: Mesh Manipulation, pp. 479-487.

Liu, et al., "A Part-Aware Surface Metric for Shape Analysis", Computer Graphics Forum, Special Issue of Eurographics 2009, vol. 28, No. 2, pp. 397-406.

Madsen, et al., "Methods for Non-Linear Least Squares Problems", Informatics and Mathematical Modelling, Technical University of Denmark, 2nd Edition, Apr. 2004, 30 pgs.

Magnenat-Thalmann, et al., "Joint-Dependent Local Deformations for Hand Animation and Object Grasping", Available at <<http://citeseerx.ist.psu.edu/viewdoc/download;jsessionid=0C5DB1B1DF9F239F54CA1422772849A2?doi=10.1.1.14.9310&rep=rep1&type=pdf>> 12 pgs. (Also, In the Proceedings on Graphics Interface '88, Published by the Canadian Information Processing Society 1989, pp. 26-33).

Mitra, et a., "Symmetrization", In the Proceedings of the International Conference on Computer Graphics and Interactive Techniques, ACM SIGGRAPH 2007 Papers, Session: Geometry Processing II, Article No. 63, 8 pgs.

Murray, et al., "A Mathematical Introduction to Robotic Manipulation", 1st Edition, CRC Press, 1994, Available at <<http://www.cds.caltech.edu/~murray/books/MLS/pdf/mls94-complete.pdf>> 474 pgs.

Popa, et al., "Material-Aware Mesh Deformations", IEEE Computer Society, In the Proceedings of the IEEE International Conference on Shape Modeling and Applications 2006, 12 pgs.

Shi, et al., "Mesh Puppetry: Cascading Optimization of Mesh Deformation with Inverse Kinematics", In the Proceedings of the International Conference on Computer Graphics and Interactive Techniques, ACM SIGGRAPH 2007 Papers, Session: Shape Deformation, Article No. 81, 9 pgs.

Sorkine, et al., "Laplacian Surface Editing", In the Proceedings of the 2004 Eurographics/ACM SIGGRAPH Symposium on Geometry Processing, Session 6, pp. 175-184 (10 pgs.).

Sumner, et al., "Embedded Deformation for Shape Manipulation", In the Proceedings of the International Conference on Computer Graphics and Interactive Techniques, ACM SIGGRAPH 2007 Papers, Session: Shape Deformation, Article No. 80, 7 pgs.

Sumner, et al., "Mesh-Based Inverse Kinematics", ACM Transactions on Graphics, vol. 24, Issue 3, Jul. 2005, In the Proceedings of the ACM SIGGRAPH 2005, Session: Mesh Manipulation, pp. 488-495 (8 pgs.).

Tolani, et al., "Real-Time Inverse Kinematics Techniques for Anthropomorphic Limbs", Academic Press Inc., Graphical Models and Image Processing, vol. 62, Issue 5, Sep. 2000, pp. 353-388.

Yu, et al., "Mesh Editing With Poisson-Based Gradient Field Manipulation", In the Proceedings of the International Conference on Computer Graphics and Interactive Techniques, ACM SIGGRAPH 2004 Papers, Session: Interactive Modeling, pp. 644-651.

Zhou, et al., "Direct Manipulation of Subdivision Surfaces on GPUs", Microsoft Research Asia, Retrieved on May 27, 2010, Available at <<http://www.kunzhou.net/publications/subd-gpu.pdf>> 9 pgs. (In the Proceedings of the ACM SIGGRAPH 2007, Session: Graphics Architecture, vol. 26, Issue 3, Article No. 91).

Zorin, et al., "Interactive Multiresolution Mesh Editing", ACM Press/Addison-Wesley Publishing Co., In the Proceedings of the 24th Annual Conference on Computer Graphics and Interactive Techniques, 1997, pp. 259-268.

* cited by examiner

JOINT-AWARE MANIPULATION OF DEFORMABLE MODELS

BACKGROUND

Traditional space deformation algorithms assume that an embedded object should be treated as a single component. However, many 3D models consist of multiple components. Problems manipulating the multiple components include time and expense for an animator to set up the joint constraints for the animation.

Constituent components of a 3D model are commonly connected by a joint of either mechanical or biological origin. These joints serve not only to segment the complex model into components, but also to constrain the relative spatial configurations of neighboring components. The deformation of different components may be represented independently of each other, which serves to eliminate the unnatural coupling that otherwise exists when multiple objects inhabit a shared space-based deformation. In addition, joints define natural degrees of freedom afforded by geometry, which allows for natural and physically-plausible deformations and poses. However, model deformation may be problematic when the model framework supports arbitrary mixes of rigid and deformable components, connected by a variety of joint types. Therefore, there is a need for a deformation framework that supports the deformation of a model including an arbitrary mix of rigid components and deformable components.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In view of the above, this disclosure describes various exemplary methods and computer-readable media for a deformation of a model including an arbitrary mix of rigid components and deformable components. This disclosure describes how a user may achieve a desired deformation on a model or may be automatically analyzed to reduce expense.

In one implementation, a connectivity of a model may be analyzed and separated into a first component and a second component. An intersection point or a contact surface for the first component and the second component are determined and used to calculate a slippable motion between the first component and the second component. The slippable motion calculation determines one or more degrees of freedom between the first component and the second component and may be mapped to a corresponding joint type.

In another implementation, a deformation framework comprises a joint analysis application and a joint aware application. The joint analysis application includes an intersection surface detection, a slippable motion analysis, a range of motion detection, and a mapping of an allowable degree of freedom to one or more joints. The process may allow creating a new pose or animation by specifying a few desired constraints for the skeletal skinned model in an interactive deformation platform.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

As described above, this disclosure describes model deformation. This disclosure describes how a user may achieve a desired deformation on a joint aware model or the deformation may be performed automatically based on computer-executable instructions.

In one implementation, a connectivity of a model may be analyzed and separated into a first component and a second component. An intersection point or a contact surface for the first component and the second component are determined and used to calculate a slippable motion between the first component and the second component. The slippable motion calculation determines one or more degrees of freedom between the first component and the second component and may be mapped to a corresponding joint type.

In another implementation, a deformation framework comprises a joint analysis application and a joint aware application. The joint analysis application includes an intersection surface detection, a slippable motion analysis, a range of motion detection, and a mapping of an allowable degree of freedom to one or more joints.

The architecture for deformation of a model is not limited to any particular application, but may be applied to many contexts and environments. For example, the architecture may be employed to the desire animation of a model on a computer screen, movement of a character within a video game, movement of a model within a slide presentation, or movement of a character in a video stream.

Exemplary Environment and System Architecture

Figure 1:
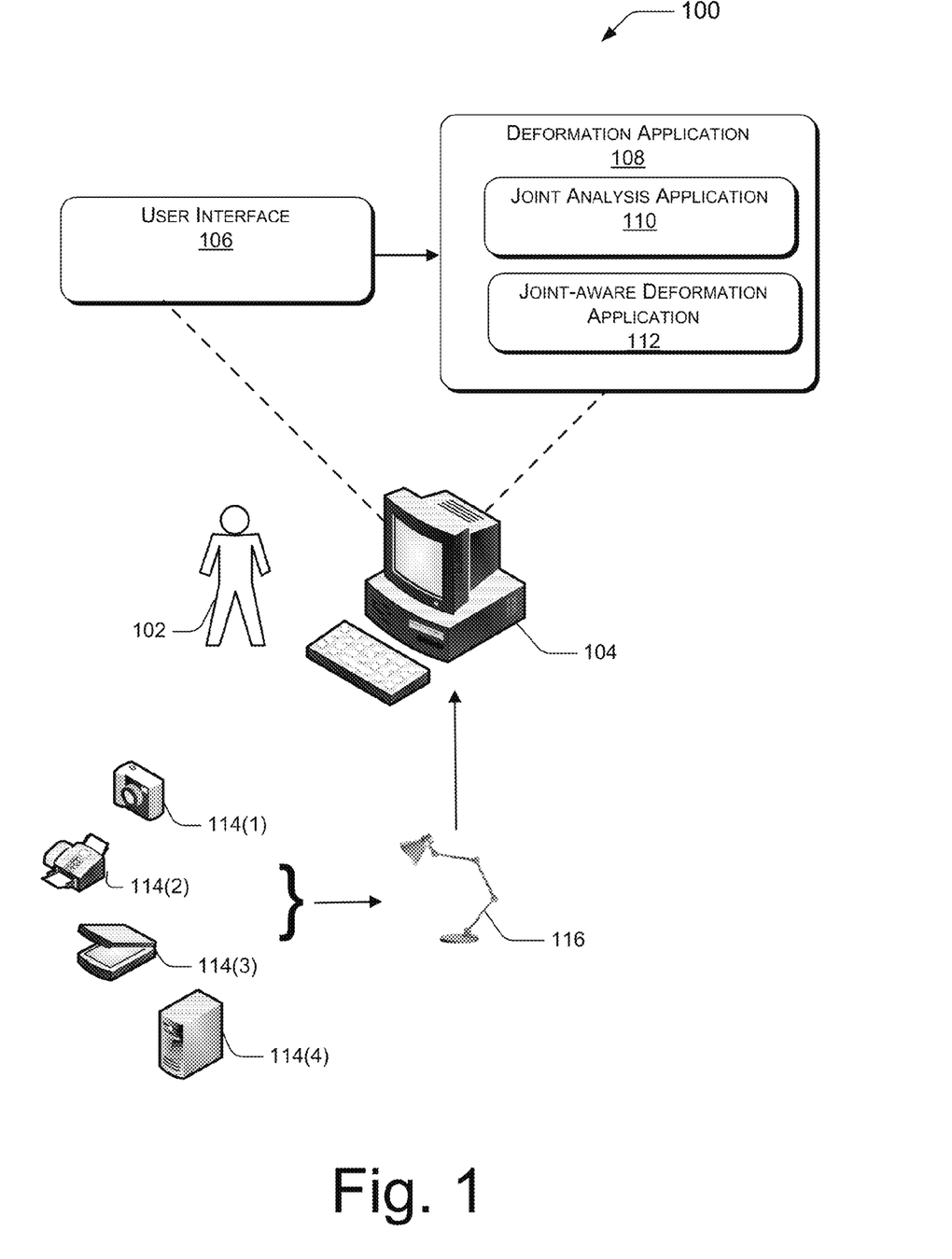
FIG. 1 is a schematic showing an illustrative architecture of deformation framework.

FIG. 1 illustrates an exemplary architecture 100 for deformation of a model including an arbitrary mix of rigid components and deformable components. Here, the techniques are described in the context of a model deformation application executing on a user's computing device. It is to be appreciated, however, that the described techniques may be implemented in a vast number of other contexts and environments.

In architecture 100, a representative user 102 may employ a computing device 104 to access a model deformation user interface 106. The computing device 104 may be implemented as any number of computing devices, including, but not limited to, a remote terminal accessing a server, a personal computer, a laptop computer, a portable digital assistant (PDA), a cell phone, a set-top box, a game console, a personal media player (PMP), and the like. The computing device 104 is typically equipped with one or more processors and memory to store applications and data.

Model deformation user interface 106 may access one or more applications including, but not limited to, a deformation application 108 including a joint analysis application 110 and a joint-aware deformation application 112. The user interface 106 generally functions to receive information input from the user 102 through input devices 114(1), 114(2), 114(3), 114(4), ... 114(N), and output information provided by the joint analysis application 110 and/or the joint-aware deformation application 112 for rendering on computing device 104. This information may include a model 116 or information pertaining to a model 116 uploaded by the user 102. The information includes a visual representation of the model deformation following both joint analysis and joint-aware deformation, an animation visually presented to the user 102 following both joint analysis and joint-aware deformation, formulas and or data representative of the joint analysis application at any point during the deformation process, formulas and/or data representative of the joint-aware deformation application at any point during the deformation process, or the like. Although the model 116 is represented as a lamp, it is to be appreciated that the model 116 may be, without limitation, a brush, a robot, any combinations of any of these or any model with one or more joints or virtual joints. In addition, as described below, the deformation application 108 may be used with a disconnected multi-component model as well as a single-component model.

The herein described deformation framework typically targets a mesh model that has built in joint connections such as that of the model 116. For a model that does not have one or more joints, or only have joints that look to be correct, but are in fact mechanically incorrect, a user 102 may interactively create and/or edit the existing joints of the model 116. It is to be appreciated however, that the model 116 is not limited to a static model. For example, the model input by user 102 may be a part of, without limitation, a video game, an animation, a video, a slide presentation, or the like.

In mechanics and robotics, typically the words joint and constraint may be used interchangeably to represent a relationship that is enforced between two or more components so that they may have specific positions and orientations relative to one another. Therefore, throughout this disclosure, the words joint and constraint are used as interchangeable terms.

Figure 2:
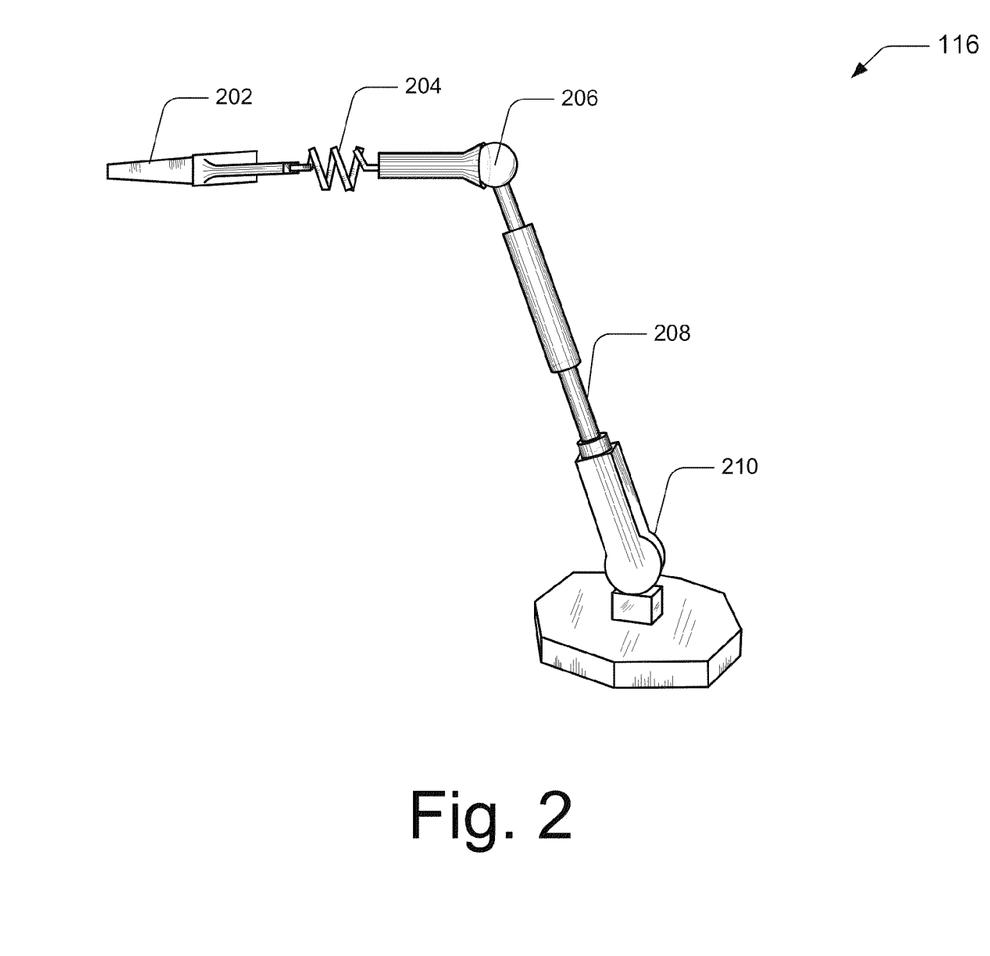
FIG. 2 is an illustrative diagram showing common mechanical joints of a model within the deformation framework of FIG. 1.

As illustrated in FIG. 2, common mechanical joints have characteristic shapes, including, without limitation, a plane joint 202, a fixed joint 204, a ball joint 206, a cylinder joint 208, or a revolute joint 210. Given a multi-component mesh model, such as the model 116 illustrated in FIG. 2, a joint analysis may output a location, an orientation, a classification, and a range of motion of each of the plane joint 202, the fixed joint 204, the ball joint 206, the cylinder joint 208 and the revolute joint 210.

In one implementation, the joint analysis application 110 includes four major acts, discussed below: an intersection surface detection, a slippable motion analysis, a range of motion detection, and a mapping of an allowable degree of freedom to one or more joints. However, it is to be appreciated that joint analysis application 110 may have additional steps or, may have fewer steps.

Figure 3:
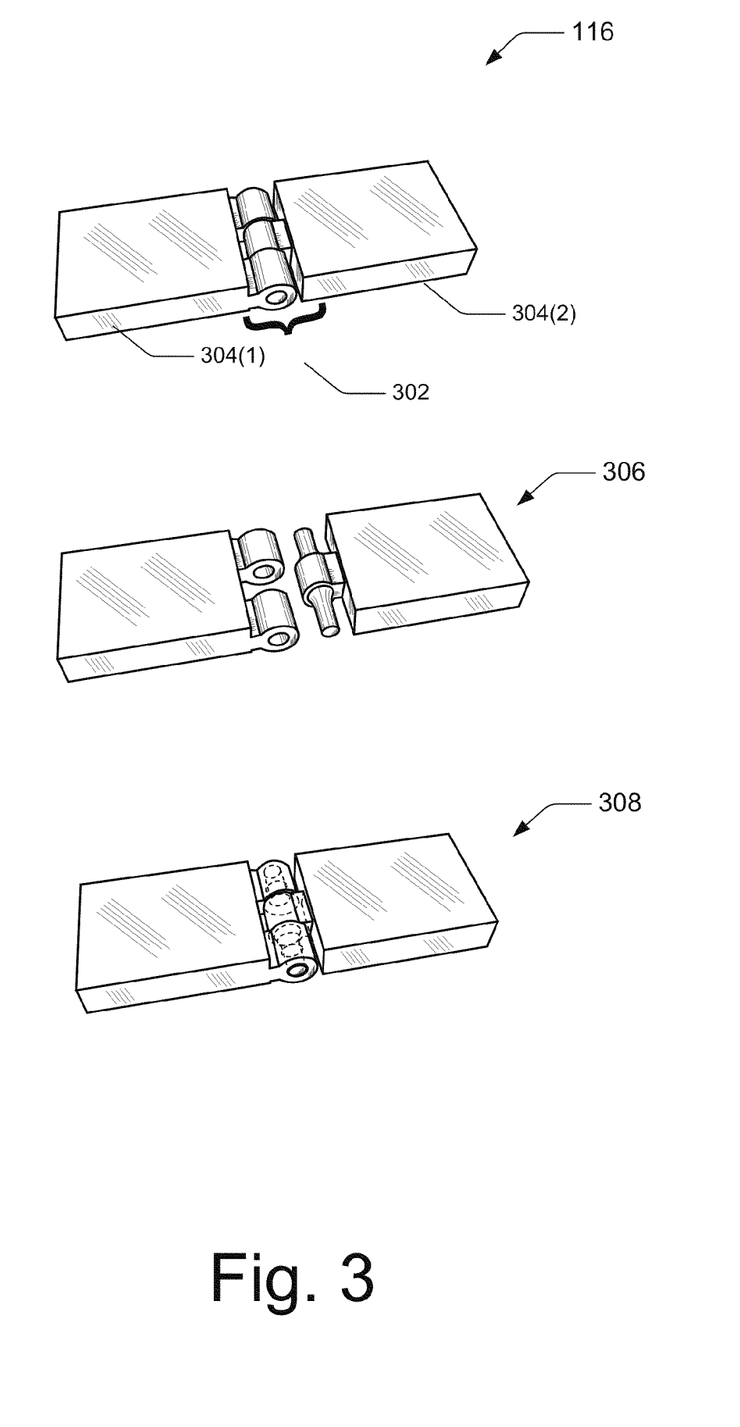
FIG. 3 is an illustrative diagram of a joint analysis application within the deformation framework of FIG. 1.

As illustrated in FIG. 3, an initial act of the joint analysis application 110 generally begins with detecting one or more intersection surfaces of one or more components. Intersection surface detection may begin by searching for the shortest distance 302 between or more pairs of components, for example component 304(1) and component 304(2), found in the input model 116. If this minimal distance is determined to be less than a user 102 specified threshold, or a threshold pre-determined by the deformation application 108, the two components are selected for further intersection detection, including, without limitation, analyzing the connectivity of the components of the input model 116. In one implementation, the threshold is based upon a defined triangle, discussed below, where a triangle within a range of about 0.1% to about 1.0% the length of the triangle may be considered for further intersection detection.

Generally, the basic object used in mesh modeling is a vertex, where two vertices connected by a straight line become an edge, and three vertices connected by way of three edges define a triangle. Therefore, analyzing the connectivity of the components of the input model may utilize the defined triangles to subdivide the model into the individual components, as illustrated in 306 and 308, whereby the individual components make up the structure of the mesh model. Furthermore, triangles inhabit a single plane and the flat nature of the triangle makes it possible to determine the surface normal of the triangle, where the surface normal may be defined as a three-dimensional vector perpendicular to the triangle's surface. As discussed below, this surface normal may be utilized to further analyze the connectivity of the one or more components.

In one implementation, the joint analysis application 110 may automatically look for vertices which are within the distance threshold to each other from the two components under inspection. However, alternatively, the user 102 may designate one or more components to undergo further inspection. During this process, the joint analysis application 110 may detect erroneous vertices. To filter out the erroneous vertices, the joint analysis application 110 may project a vertex of one component along its normal until it intersects with a triangle on the other component, and then compute the normal of the intersected triangle. Only when the angle between these two normals exceeds a certain threshold, the vertex will be kept for subsequent analysis. In one implementation, the angle threshold may be about 145 degrees however, it is to be appreciated that any reasonable angle may be used. In an implementation, there may be five or more valid vertices. When the five or more valid vertices are detected between two components, such as the component 304(1) and the component 304(2), the joint analysis application 110 may pass the determined vertices of the intersection and contact surfaces onto the following act of the joint analysis application, the slippable motion analysis.

Generally, slippable motion is defined as rigid motions which, when applied to a shape, slide the transformed version against the original copy without forming any gaps. That is, the shape is invariant under its slippable motions. Typically, slippable shapes include rotationally and translationally symmetrical shapes such as planes, spheres, and cylinders. Touching slippable shapes may undergo their corresponding slippable motions without penetrating each other, and therefore are often found in joints for mechanical models. For instance, the slippable motions for a cylinder include rotations around the cylinder's axis and translations along the axis.

In one implementation, slippable motions may be computed as a least-squares problem whose minimum is a solution of a linear system Cx=0. Alternatively, the slippable motion may be computed using any suitable problem. Using a least-square problem, the slippable motions of a point set P are those values that belong to the null space of the covariance matrix C. Eigenvectors of C, where the, corresponding eigenvalues are zero corresponding to the slippable motions of point set P. The valid relative motions may then be determined between two components, such as the component 304(1) and the component 304(2) by detecting the components of interest intersection surfaces and calculating two components slippable motions.

Generally, slippable motion analysis only outputs the degrees of freedom (DOFs) of valid motions between two components. Information such as range of motion information, including, without limitation, angle limits of rotational joints, or translational limits of prismatic joints is not provided. Therefore, the next act of the joint analysis application 110 outlined above provides for an analysis to detect additional joint parameters. This process, in one implementation, involves a trial-and-error bisection process. For example, translational limits of the model 116 may be probed by sliding a component along its translational axis until penetration occurs. Angle limits of rotational joints may be detected in a similar fashion. If the feasible range of motion direction is less than a chosen or pre-determined threshold, the Degrees of Freedom (DOF) will be removed from the system. In one implementation, a rotational DOF may be removed if the valid range of motion (RoM) is less than 10 degrees. A translation DOF may be removed if the RoM is less than 2% of the length of the diagonal of the bounding boxes enclosing adjacent components Detected slippable motion constraints may be modeled as typical joint types used in mechanics, as shown in Table 1, below. While prismatic, revolute, and ball joints are standard joints in mechanics, the plane, cylinder, and fixed joints require additional elaboration. For example, plane joints describe the case of two components having planar contact, which may slide and rotate on the plane relative to each other. Cylinder joints have an additional translational DOF compared to revolute joints. Fixed joints maintain a fixed relative position and orientation between two bodies. That means there are no allowable motions between these components. Generally, fixed joints exist because all eigenvalues computed by slippable motion analysis may be larger than a certain pre-determined threshold, and semantically these components should not move relatively to each other. In addition, user 102 is able to override the type of joints and adjust their range of motion parameters, if the user 102 is not satisfied with the results suggested by the system. For example, the user may wish to replace a ball joint with a plane joint to achieve a desired movement from an input model, such as the model 116.

The final act of the joint analysis application 110, may utilize the information determined in at least those acts of the joint analysis application 110 outlined above, to enable the joint analysis application 110 to map the computed degrees of freedom to the corresponding joint type. For example, Table 1 below illustrates example slippable motions of various types of surfaces in a first column and the corresponding mapping to the type of joints shown in the last column.

TABLE 1

| Type of Surface | Eigenvalues | Slippable Motions | Type of Joint |
|---|---|---|---|
| Sphere | 3 | 3 Rotational. | Ball |
| Plane | 3 | 2 translational, 1 rotational | Plane |
| Cylinder | 2 | 1 translational, 1 rotational. | Cylinder |
| Linear Extrusion | 1 | 1 translational | Prismatic |
| Surface of Revolution | 1 | 1 rotational | Revolute |
| Non-slippable | 0 | 0 translational, 0 rotational | Fixed |

Given a set of identified components and the identified components for joint constraints, a deformation framework may undergo further analysis using the deformation application 108. Specifically, the information determined by the joint analysis application 110 may be passed on to the joint-aware deformation application 112.

Figure 4:
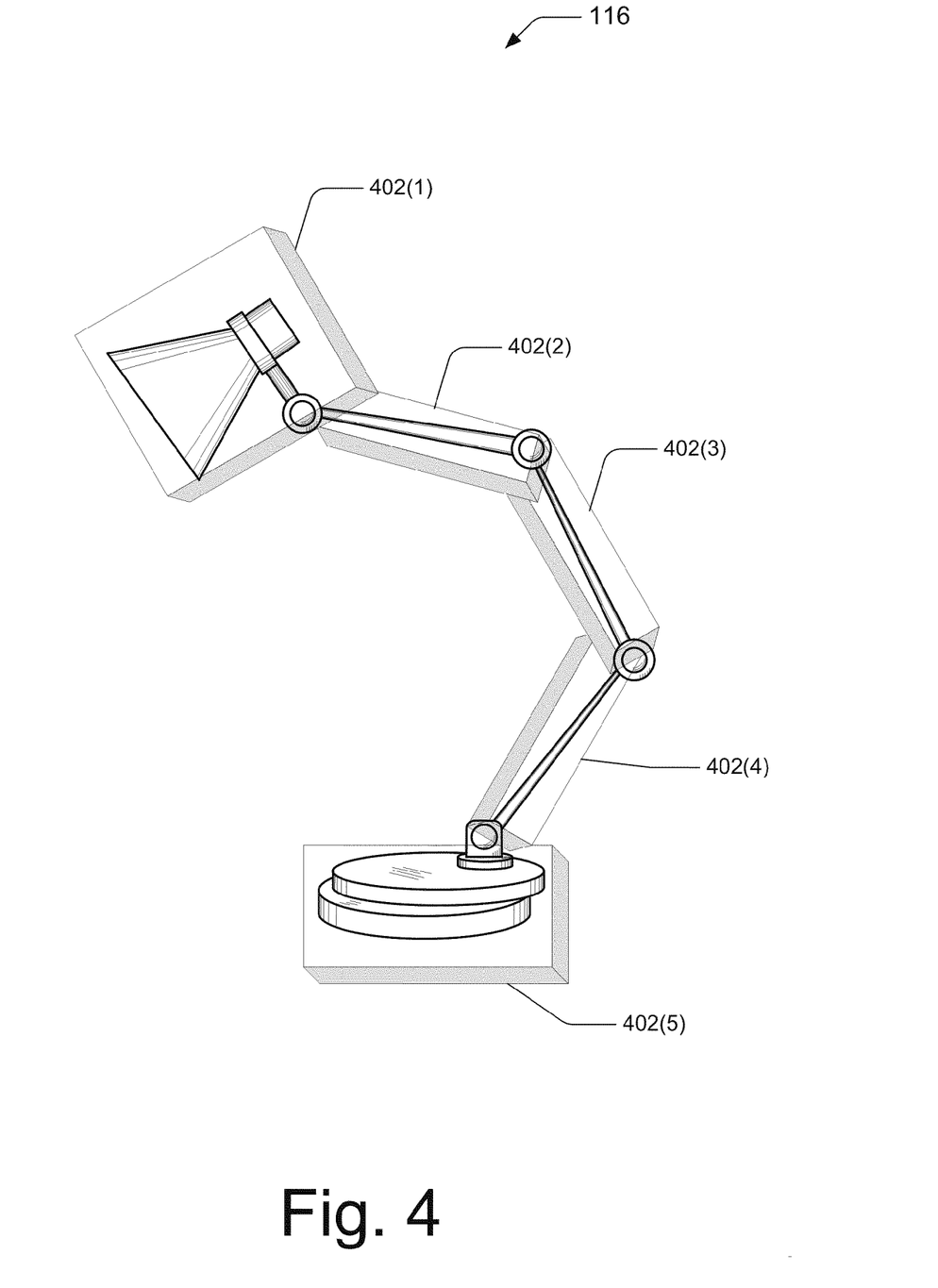
FIG. 4 is an illustrative diagram of a local spatial grid within the deformation framework of FIG. 1.

As illustrated in FIG. 4, the joint-aware deformation application 112 may include a deformation algorithm for performing a space deformation, where the deformation algorithm may be initiated by building a local spatial grid 402(1), 402(2), 402(3), 402(4), and 402(5) for each identified component of model 116, and associating one or more transformation parameters with each local grid. In one implementation, the deformation algorithm is formulated as a non-linear optimization problem including, without limitation, an objective function supporting at least deformation edits and constraints. Alternatively, the deformation algorithm may be formulated to use any suitable optimization equation. The objective function may be comprised of energy terms corresponding to shape deformation and error terms related to joint constraints and manipulation goals.

As further illustrated in FIG. 4, to decouple motions of different components, an individual grid for each identified component within the model 116 may be created. For example, an oriented bounding box (OBB) or a cuboid cell, for example, 402(1), 402(2), 402(3), 402(4), and 402(5), $C_k$ for each component, k, may be calculated. Alternatively, the OBB may be a cell of any suitable shape which enables the desired deformation result. If user 102 desires to freely deform component k, cuboid cell $C_k$ may be further subdivided into additional cells using either octree or uniform subdivision.

Figure 5:
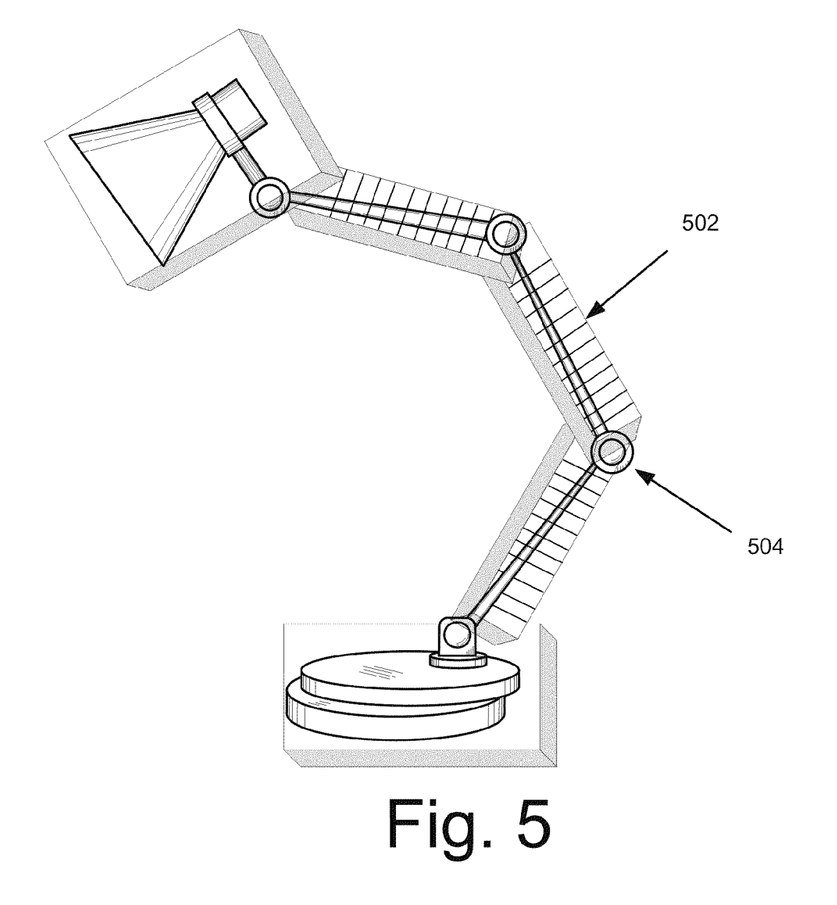
FIG. 5 is an illustrative diagram of transformation parameters associated with a cell of a component or a component.

In one implementation, the influenced region of a joint may be defined as the OOB of the valid vertices from the intersection surfaces that generate the joint. As illustrated in FIG. 5, the cells intersecting with or contained by the one or more influenced regions may be called an influenced cell 502. The influenced cell 502 from a same individual component share a common transformation 504, for example, one joint may only relate two transformations, where $T_k^m = \{R_k^m, p_k^m\}$ is the associated common transformation 504, $R_k^m$ is a 3×3 matrix, and $p_k^m$ is a 3×1 translation vector.

However, in other implementations $R_k^m$ may be any compatible matrix and $p_k^m$ may be any compatible translation vector. The vertices of the cell $C_k^m$ may be denoted by $v_k^{m,i}$, i=0 . . . 7.

In one implementation, joint-aware deformation application 112 utilizes cuboid cells which are as rigid as possible during the deformation process. Alternatively, cuboid cells may be less rigid, depending upon the desired deformation result. Generally, rigidity measures how much a cell preserves the cell's original shape during the deformation process. In determining the measurement of a rigid transformation, $T_k^m$, $R_k^m$ may be a rotation in a special orthogonal rotational group such as SO(3). Further, the measure of rigidity of a transformation may be computed using the $R_k^m$ from a pure rotation. For example:

$$\text{Rigid } R_k^m = (c_{k,1}^m \cdot c_{k,2}^m)^2 + (c_{k,1}^m \cdot c_{k,3}^m)^2 + (c_{k,2}^m \cdot c_{k,3}^m)^2 + (c_{k,1}^m \cdot c_{k,1}^m - 1)^2 + (c_{k,2}^m \cdot c_{k,2}^m - 1)^2 + (c_{k,3}^m \cdot c_{k,3}^m - 1)^2 \quad \text{Equation (1)}$$

where $c_{k,i}^m$, i=1, 2, 3 are the column vectors of matrix $R_k^m$. The energy term $E_{rigid}$ may be formed by accumulating the rigidity of every cell:

$$E_{rigid} = \Sigma \text{Rigid}(R_k^m) \quad \text{Equation (2)}$$

Elastic strain energy measures the local variation of the common transformation 504. For example, elastic strain energy may measure the differences of neighboring cells' motions. It generally emulates the ability of elastic materials to resist bending and stretching. Elastic strain energy may be represented by:

$$E_{strain} = \sum_{k,m} \sum_{j \in N_k} \|T_k^m v_k^{m,i} - T_k^j v_k^{m,i}\|^2 \quad \text{Equation (3)}$$

where $N_k^m$ denotes the set of neighboring cells $C_k^m$, and $v_k^{m,i}$, i=0 ... 7 denotes the cell $C_k^m$.

In one implementation, the second term within the optimization function may include, without limitation, joint constraint errors. One common method for representation of joint constraints may be to use the full coordinates of the cuboid cell supplemented with constraints that remove redundant DOFs. By posing joint constraints on the cell transformations in a similar fashion, a unified optimization framework may be developed, enabling joint constraints to be maintained and achieving shape deformations simultaneously.

Figure 6A:
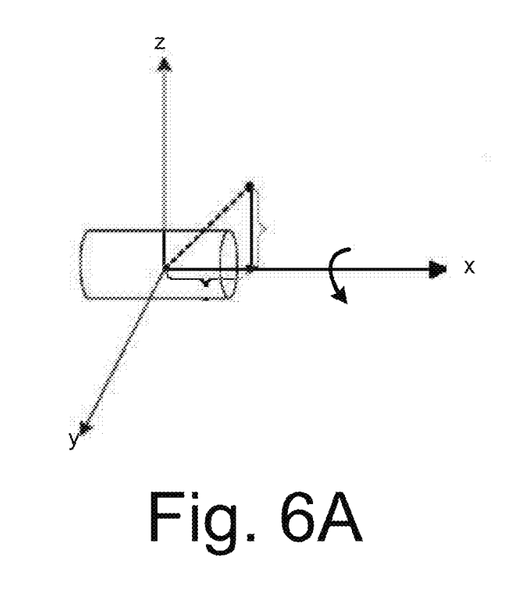
FIG. 6A is an illustrative diagram of transformation a geometric invariant of a revolute joint within the local spatial grid.
Figure 6B:
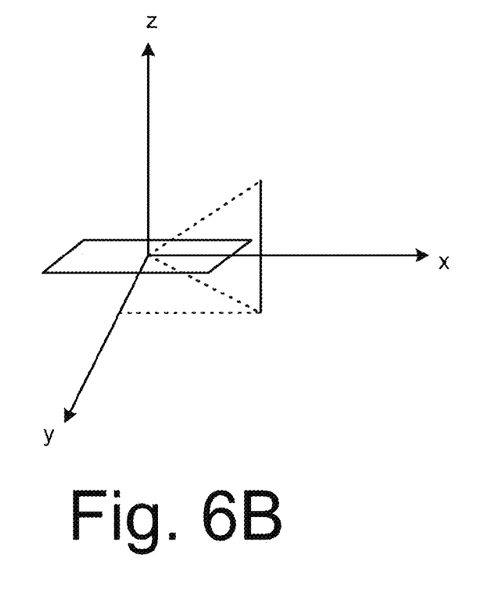
FIG. 6B is an illustrative diagram of a transformation geometric invariant of a prismatic joint with the local spatial grid.

For example, as illustrated in FIG. 6, a joint and the attached local frame may be denoted by {J,c,F=X,Y,Z}. J represents the type of joint, which, as described above, is an element of the set {revolute, cylinder, prismatic, plane, ball, and fixed}, where FIG. 6A represents a geometric invariant of a revolute joint and FIG. 6B represents a geomectric invariant of a prismatic joint. However, in other implementations, the joint may be any other type of joint. Each type of joint defines a set of geometric invariants, such as distances between cell vertices and/or joint axes. Preserving invariants during the deformation process enforces the joint constraints accordingly.

As illustrated in FIG. 6A, a revolute joint typically only has one rotational degree of freedom. The geometric invariants of a revolute joint are the projected distance and the axial distance between a cell vertex and the rotation axis as illustrated in FIG. 6A. The rotation axis should also remain the same under any valid rotation of the revolute joint. We formulate the three geometric invariants of a revolute joint as follows:

$$E_{RJ1} = \sum_i \|(T_{k1}^m v_{k1}^{m,i} - T_{k2}^n c) \cdot R_{k2}^n X - (v_{k1}^{m,i} - c) \cdot X\|^2 \quad \text{Equation (4)}$$

$$E_{RJ2} = \sum_i \|T_{k1}^m v_{k1}^{m,i} - T_{k2}^n p_{k1}^{m,i}\|^2 - |v_{k1}^{m,i} - p_{k1}^{m,i}|^2$$

$$R_{RJ3} = \|R_{k1}^n X - R_{k2}^n X\|^2$$

where • represents dot product. $T_{k1}^m$ and $T_{k2}^m$ are the transformations of two cells influenced by the revolute joint, and $p_{k1}^{m,i}$ is the projection point of vertex $v_{k1}^{m,i}$ on the X axis. Minimizing $E_{RJ1}$ and $E_{RJ2}$ maintains the invariance of the projected and axial distance, and a zero $E_{RJ3}$ enforces a static rotation axis under rotations. The error term of a revolute joint is given by the sum of the above three terms:

$$E_{Rev} = E_{RJ1} + E_{RJ2} + E_{RJ3} \quad \text{Equation (5)}$$

Detected joint limits need may be implemented in order to prevent components connected by the revolute joint from penetrating each other. For example, each cell $C_{k1}^m$ influenced by a revolute joint, a vector $d_{k1}^{m,i} = v_{k1}^{m,i} - p_{k1}^{m,i}$ for its ith vector may be computed. $d_{k1}^{m,i}$ is then rotated about the rotation axis X. $d_l^i$ and $d_{ll}^i$ denote the lower and upper bounds when $d_{k1}^{m,i}$ lies in between the two limit vectors $d_l^i$ and $d_{ll}^i$. When the transformed vector $d_{k1}^{m,i}$ is within the valid range of motion, the penalty term returns zero, otherwise it returns the distance to the closest bounding vector $d^i$.

$$E_{RM} = \sum_i \|(T_{k1}^{m,i} v^{m,i} - T_{k2}^n p_{k1}^{m,i}) - T_{k2}^n d^i\|^2 \quad \text{Equation (6)}$$

A cylinder joint has one or more translational degrees of freedom than a revolute joint. Therefore, a changeable projected distance during manipulation of the components should be allowed for. In one implementation, such an allowance may be accounted for by removing the projected distance term $E_{RJ1}$ from Equation 5 above, resulting in the following error for cylinder joints:

$$E_{Cyn} = E_{RJ2} + E_{RJ3} \quad \text{Equation (7)}$$

Prismatic joints are widely used in mechanisms to constrain one component to translate along a fixed axis without any rotation. As illustrated in FIG. 6B, for a prismatic joint {Prismatic, c, {X,Y,Z}}, the axis is the sliding axis along which the component may slide. The geometric invariants of prismatic joints are the distance between a cell vertex and the XY plane, and the projected distance of a cell vertex on the Y axis, as illustrated in FIG. 6B. In one implementation, the geometric invariants for, a prismatic joint may be expressed as:

$$E_{PJ1} = \sum_i \|(T_{k1}^m v_{k1}^{m,i} - T_{k2}^n c) \cdot R_{k2}^n Z - (v_{k1}^{m,i} - c) \cdot Z\|^2 \quad \text{Equation (8)}$$

$$E_{PJ2} = \sum_i \|(T_{k1}^m v_{k1}^{m,i} - T_{k2}^n c) \cdot R_{k2}^n Y - (v_{k1}^{m,i} - c) \cdot Y\|$$

where $T_{k1}^m$ and $T_{k2}^m$ are cell transformations from components k1 and k2 respectively that are constrained by the prismatic joint. The total error term for prismatic joints is thus a sum of the above two terms:

$$E_{Prism} = E_{PJ1} + E_{PJ2} \quad \text{Equation (9)}$$

Similar to revolute joints, $d_{k1}^{m,i}$ denotes the vector from the cell vertex $v_{k1}^{m,i}$ to the projection on the XY plane $p_{k1}^{m,i}$. The limit, vectors $d_l^i$, $d_{ll}^i$ of $d_{k1}^{m,i}$ may be calculated as before, and a penalty term similar to Equation 5 above.

Plane joints may be used to enforce planar contacts between two components. For example, a plane joint typically represents two objects which can slide and rotate within a shared plane where the two components are in contact. The two components do not interpenetrated one another nor are they separated. A plane joint may be may be implemented, in one example, by monitoring a plane distance between neighboring cells of the two contacting components. The geometric invariant may be the distance between a cell vertex and the sliding plane.

Ball and socket joints have three rotational degrees of freedom and may typically be found in biological systems, for example, a hip and shoulder joint of a modeled human character. When two components are connected by a ball-and-socket joint {Ball, c, {X, Y, Z}}, they both attach to the center c. Therefore, transformations of each component should keep the anchor point c together. The error term to impose a ball-and-socket joint may be:

$$E_{Ball} = \|T_{k1}{}^m c - T_{k2}{}^n c\|^2 \quad \text{Equation (10)}$$

To enforce joint limits for a ball joint, in one implementation, a decomposition of the rotation between $T_{k1}{}^m$ and $T_{k2}{}^n$ into Euler angles. If the Euler angles are out of the bounds of the cuboid cell, the Euler angles may be projected back into a valid range and compute the corresponding limit vector $d^i$ by the projected valid rotation. The penalty term may then be constructed similar to equation 5 above.

A fixed joint holds two components fixed with respect to each other. All cells influenced by the fixed joint from both components may have identical transformations. In one implementation, this may be implemented as a hard constraint in a pre-processing stage before the optimization to ensure two components will not move relative to each other around the fixed joint.

In one implementation, the shape deformation described above may be used to solve the unconstrained non linear optimization problem:

$$\min_x f(x)^T f(x) = E_{FFD} + w_j E_{JNT} + w_p E_{RM} \quad \text{Equation (11)}$$

where: $E_{FFD} = w_{rigid} E_{rigid} + w_{strain} E_{strain} + w_{pos} E_{pos}$ $E_{JNT} = E_{Rev} + E_{Cyn} + E_{Prism} + E_{Plane} + E_{Ball}$ In Equation 11, x is the aggregation of all cell transformations $T_k{}^m$, where k=1 ... j, and m=1 ... j$_k$. In one implementation, $w_j$=1e5 and $w_j$=1e8. However, it is to be appreciated that $w_j$ and $w_p$ do not have to be exact, any large value may be substituted. Because typically each cell transformation has 12 DOFs, the total dimension of the optimization parameter x is around twelve times the number of cells. $E_{JNT}$ enforces joint invariants, and $E_{RM}$ penalizes violation of joint limits. Fixed joints do not appear in the objective function because the fixed joint is modeled by mapping all of the transformations of influenced cells to one single transformation variable. In one implementation, all joint deformation is treated equally so that each joint constraint has equal weight in equation 11.

In one implementation, an iterative Gauss-Newton method may be utilized to solve the non linear optimization problem found in equation 12. At each iteration t, the algorithm solves a linearized sub problem, and computes an updated vector $d_t$ to improve the current solution $x_t$:

$$\min_{d_t} \|J_t d_t + f(x_t)\|^2 \quad \text{Equation (12)}$$

$$x_{t+1} = x_t + d_t$$

where $J_t$ is the Jacobian of f(x). The analytic Jacobian $J_t$ is sparse and the non-zero structure remains the same across iterations. Therefore, a pre-computed symbolic factorization of $J^T$, $J_T$ may be re-used to accelerate the numerical factorization at every iteration. Furthermore, updating of $J_t$ may be parallelized on multi-core platforms commonly available to achieve improved performance. For example, without limitation, the PARDISO (Parallel Direct Sparse Solver) from the Intel Math Kernel Library 10.0 may be used.

Non-Jointed Models

Figure 7A:
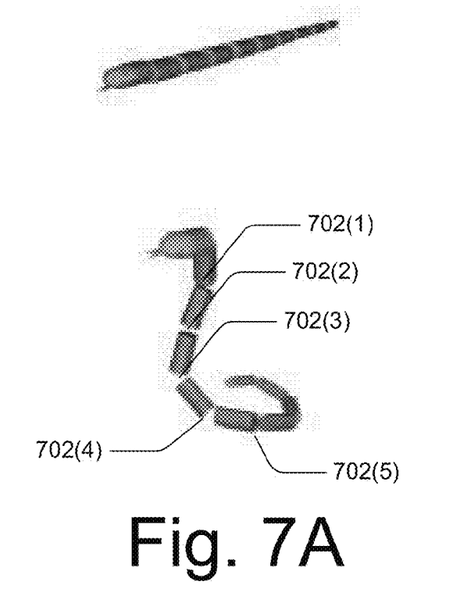
FIG. 7A is an illustrative diagram of a disconnected multi-component model.
Figure 7B:
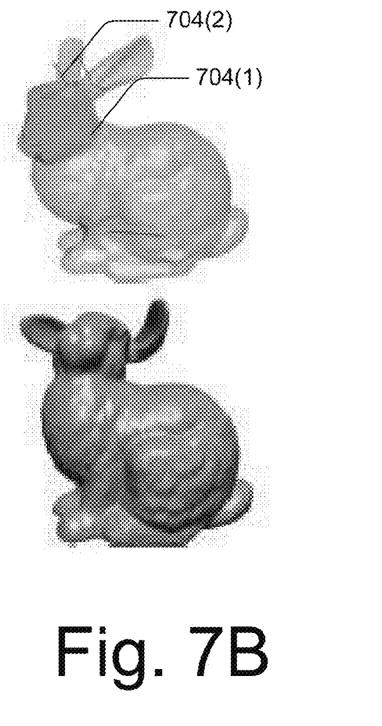
FIG. 7B is an illustrative diagram of a single component model.

Typically the joint analysis algorithm described above may not be applied to disconnected multi-component models and single-component models. However, as illustrated in FIGS. 7A and 7B, such models may benefit from the deformation framework with assistance from a user to define desired joints. Specifically, FIG. 7A illustrates the effect of joint-aware deformation on a cartoon snake consisting of multiple disconnected segments. The user 102 may manually create one or more ball joints 702(1), 702(2), 702(3), ..., 702(N) between adjacent segments to allow the snake model to dance.

In addition, FIG. 7B illustrates a single component model in the form of a bunny model. The user 102 may manually create two virtual revolute joints 704(1) and 704(2) between the ears and the body. The head may be made fully rigid by designating a single shared transformation for all of the cells belonging to the head region. As a result of the existence of the virtual joints, the elastic strain energy is discontinuous around the base of the ears.

Exemplary Method

Figure 8:
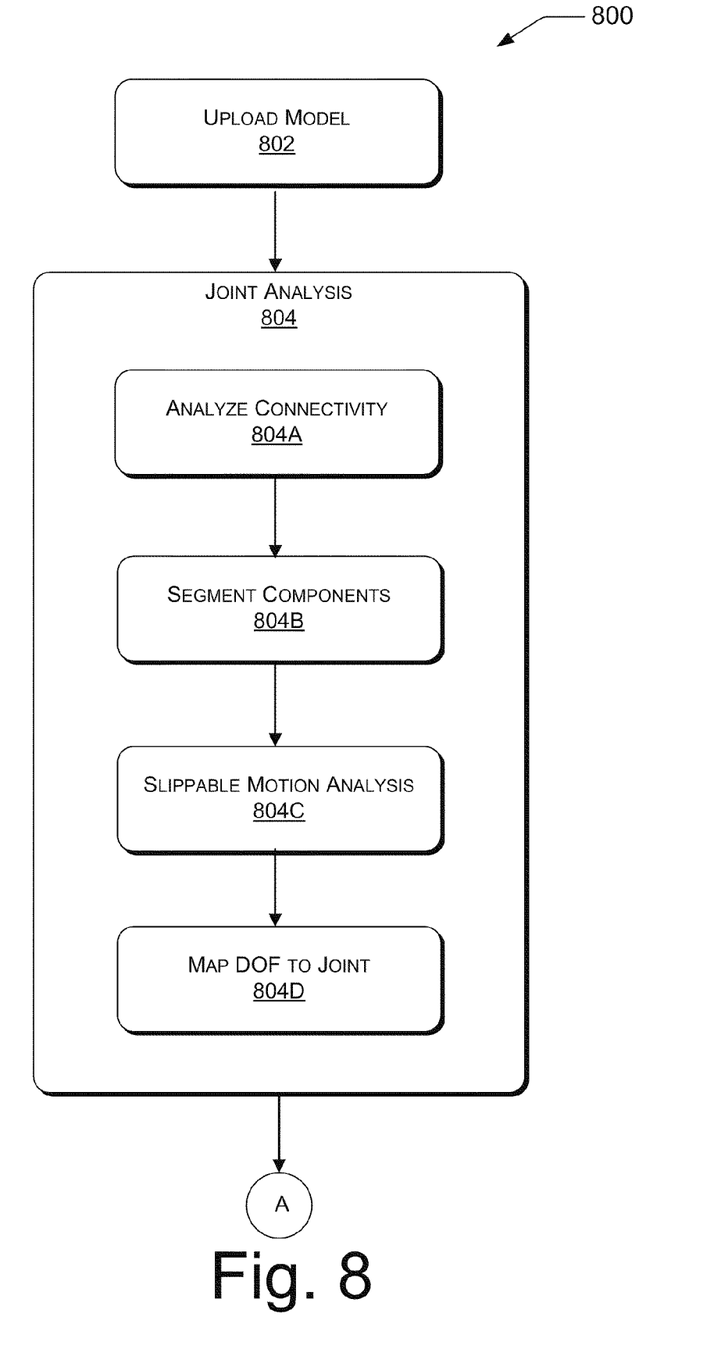
FIG. 8 is an illustrative process flow for a joint analysis application.

FIG. 800 illustrates an exemplary method 800 for a deformation model, as described herein, for a connected multi-component model. The method 800 begins by uploading a model as represented in block 802. The device 104 may retrieve model information stored on a local storage device, a remote storage device or may upload the model via a fax, scanner, or the like. After uploading the model information, a joint analysis 804 is performed. Joint analysis 804 begins by analyzing the connectivity of the model input by the user 102 in block 804A, separating the model into one or more independent components. In block 804B, each of the independent components are segmented into near convex parts and their convex hull. The convex parts and convex hull may be used to determine the intersection and contact surface between two or more components. In block 804C, a slippable motion analysis may be performed using the vertices of the determined intersection and contact surfaces. Such an analysis will keep the two components in contact with each other during the manipulation of the model throughout the deformation process. The degree of freedom of motions for each intersection and contact surface are mapped to various types of joints in block 804D. The types of joints may include, without limitation, revolute, cylinder, prismatic, plane, ball, fixed, and the like.

Figure 9:
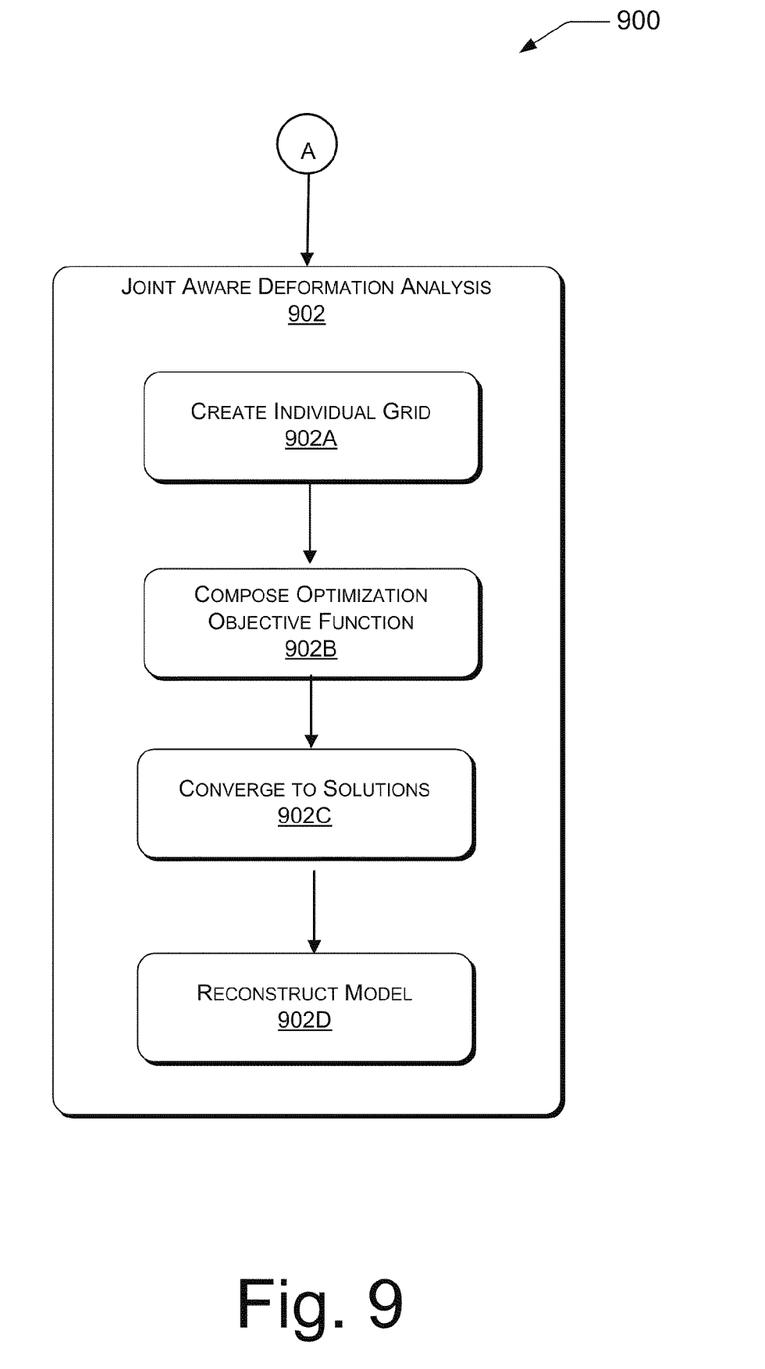
FIG. 9 is an illustrative process flow for a deformation application.

Given a set of components and joints identified during joint analysis 900, as described above, a joint-aware deformation analysis 902 is illustrated in FIG. 9. The joint-aware deformation analysis begins in block 902A by creating an individual grid for each identified individual component. In one implementation, the individual grid may be a cuboid cell enclosing the bounds of the identified component. Specifically, the user 102 may calculate the oriented bounding box for each individual component. If the user 102 would like to freely deform a specific individual component, that component may be further subdivided into cells using either an octree or uniform subdivision. In block 902B, an optimization objective function is composed utilizing two separate terms, a shape deformation term and a joint constraint term. In one implementation, joint constraints correspond to error terms and energy terms correspond to shape deformation. The affine transformations associated with each cell of each individual component based local grid, represents an optimization parameter. In block 902C, an iterative Gauss-Newton solver converges to solutions at rates that support an interactive manipulation. From transformations of each of the identified cuboid cells, a model 902D may be reconstructed using a moving-least-squares interpolation.

Figure 10:
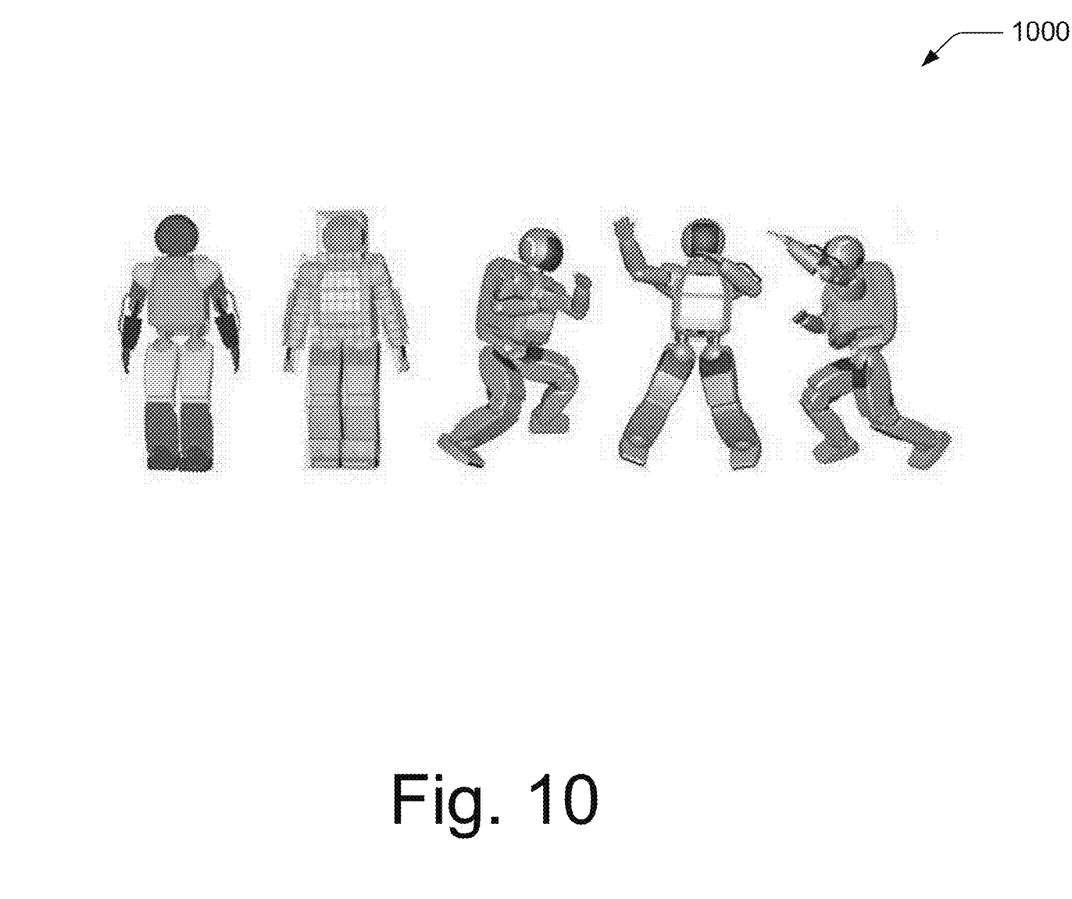
FIG. 10 is an illustrative diagram of a transformation using the deformation framework of FIG. 1.

FIG. 10 demonstrates the method as described above in process flow 800 and process flow 900 in the architecture of deformation framework shown in FIG. 1. The example in FIG. 10 is illustrated as an Asimo-like robot however, it is to be appreciated that the model may be any suitable model. As illustrated in FIG. 10, the arm tube deforms properly as the motion of the robot changes, enabling a realistic deformation of the robot throughout the deformation process. As further illustrated in FIG. 10, chosen body parts may be either rigid or deformable to achieve certain desired effects of the model.

Exemplary Computer System

Figure 11:
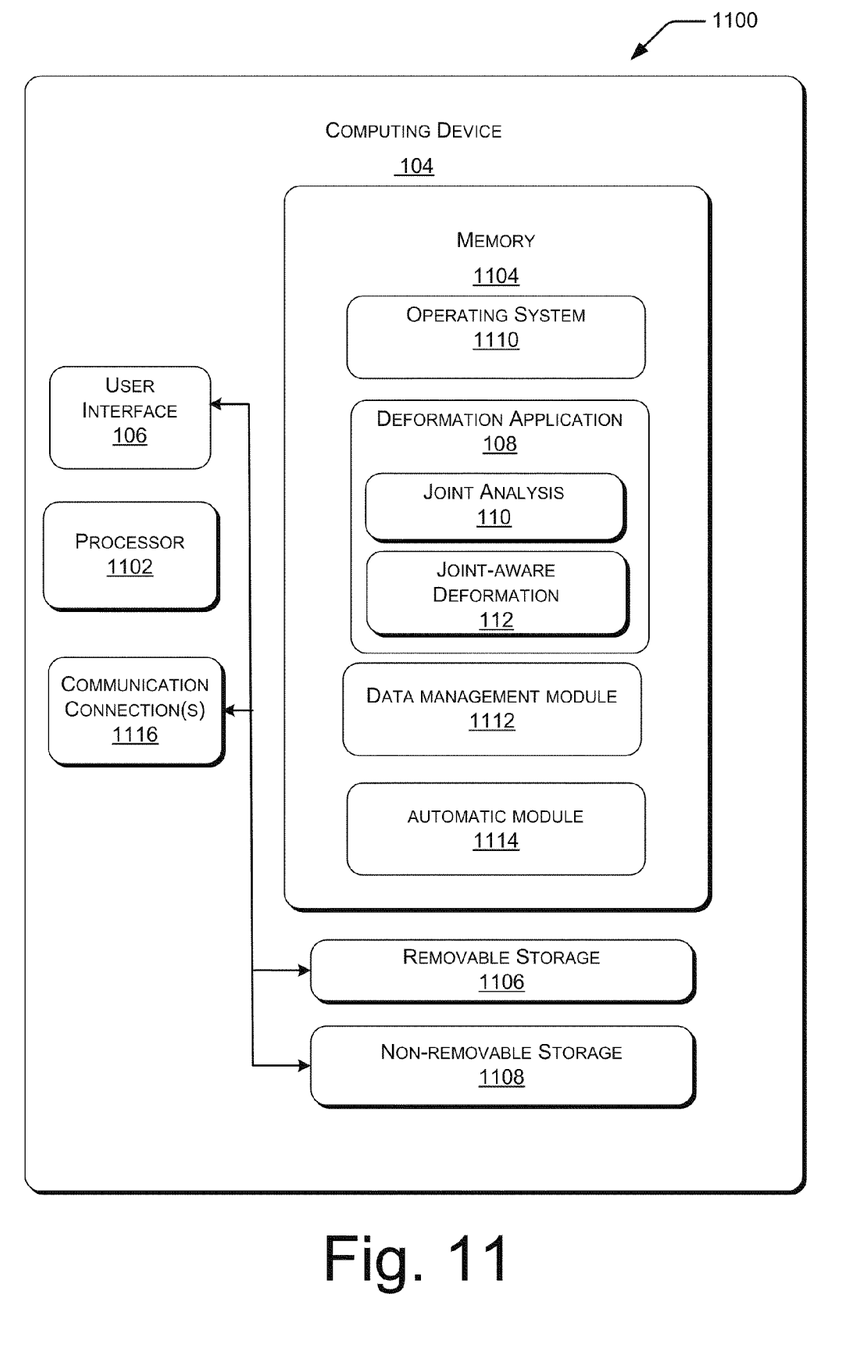
FIG. 11 is an illustrative diagram of a computing device.

FIG. 11 is a schematic block diagram 1100 of an exemplary computing device 104. In one exemplary configuration, the computing device 104 comprises at least one general processor 1102, a memory 1104, and a user interface 106. The processing unit 1102 may be implemented as appropriate in hardware, software, firmware, or combinations thereof. Software or firmware implementations of the processing unit 1102 may include computer- or machine executable instructions written in any suitable programming language to perform the various functions described.

Memory 1104 may store programs of instructions that are loadable and executable on the processor 1102, as well as data generated during the execution of these programs. Depending on the configuration and type of proxy server, memory 1104 may be volatile (such as RAM) and/or non-volatile (such as ROM, flash memory, etc.). The computing device 104 may also include additional removable storage 1106 and/or non-removable storage 1108 including, but not limited to, magnetic storage, optical disks, and/or tape storage. The disk drives and their associated computer-readable medium may provide non-volatile storage of computer readable instructions, data structures, program modules, and other data for the communications devices.

Memory 1104, removable storage 1106, and non-removable storage 1108 are all examples of the computer storage medium. Additional types of computer storage medium that may be present include, but are not limited to, RAM, ROM, flash memory or other memory technology, CD-ROM, DVD, or other optical storage, magnetic cassettes, magnetic tape, magnetic disk storage or other magnetic storage devices, or any other medium which may be used to store the desired information and which may be accessed by proxy server 104. In one implementation, these components reside on one proxy server 104. Alternatively, these components may reside in multiple servers.

Turning to the contents of the memory 1104 in more detail, the memory may include an operating system 1110, deformation application 108, joint analysis 110, and joint-aware deformation application 112. Furthermore, these illustrated components may combine to form a single component at a single location.

In one implementation, the memory 1004 includes a data management module 1112 and an automatic module 1114. The data management module 1112 stores and manages storage of information, such as images, ROT, equations, and the like, and may communicate with one or more local and/or remote databases or services. The automatic module 1114 allows the process to operate without human intervention. The computing device 104 may also contain communications connection(s) 1116 that allow processor 1002 to communicate with other services. Communications connection(s) 1116 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media.

Conclusion

Although embodiments for the deformation of a model have been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method comprising:

analyzing, by using a processor, a connectivity of a model comprising an arbitrary mix of one or more rigid links and one or more soft links, wherein the analyzing includes triangles as input;

separating one or more connections of the triangles of the joint aware model into at least a first component and a second component;

segmenting the first component and the second component to determine at least one intersection or at least one contact surface between the first component and the second component;

in response to the segmenting, utilizing vertices of the at least one intersection or the at least one contact surface to compute a slippable motion between the first component and the second component, wherein the slippable motion computation results in a determination of one or more degrees of freedom between the first component and the second component; and mapping the one or more degrees of freedom to one or more joint types.

2. The method of claim 1 further comprising developing a deformation algorithm using:

a spatial grid generation; and a non linear optimization.

3. The method of claim 2, wherein the spatial grid generation is based upon the mapping of the one or more degrees of freedom to the one or more joint types.

4. The method of claim 2, wherein the spatial grid generation comprises a component-wise local grid, the component-wise local grid has at least a cell in an initial configuration.

5. The method of claim 4, wherein the component-wise local grid is calculated using an oriented bounding box $C_k$ for each of the first component and the second component.

6. The method of claim 4, wherein the component-wise local grid is further subdivided into additional cells.

7. The method of claim 2, wherein the non linear optimization comprises at least an objective function component supporting a deformation edit and a constraint, wherein the deformation edit corresponds to one or more energy terms and the constraint corresponds to one or more error terms.

8. The method of claim 1, wherein the segmenting determines both an intersection and a contact surface.

9. The method of claim 1, wherein the analyzing the connectivity of the joint aware model is performed automatically.

10. The method of claim 1, wherein the one or more joint types comprises at least one of a revolute joint, a cylinder joint, a prismatic joint, a plane joint, a ball joint, or a fixed joint.

11. One or more computing devices, comprising:
one or more processors;
a memory coupled to the one or more processors; and
a user interface to execute a joint-aware deformation framework, stored in the memory and executable on the one or more processors, the user interface is to:
  receive a model comprising an arbitrary mix of one or more rigid links and one or soft links with triangles as input;
  separate the triangles of the model into one or more components;
  perform a slippable motion calculation for the one or more components to compute one or more degrees of freedom for the corresponding one or more components, wherein the one or more degrees of freedom are mapped to a corresponding joint type;
  determine one or more cuboid cells associated with the one or more components; and
  solve a non linear optimization problem to achieve a user desired deformation of the model.

12. The one or more computing devices of claim 11, wherein the slippable motion calculation is performed automatically.

13. The one or more computing devices of claim 12, wherein the corresponding joint type comprises at least one of a revolute joint, a cylinder joint, a prismatic joint, a plane joint, a ball joint, or a fixed joint.

14. The one or more computing devices of claim 11, wherein the slippable motion calculation is performed using a least-squares problem.

15. The computer-implemented method of claim 1, wherein the separating comprises:
  establishing a shortest distance between the first component and the second component;
  determining whether the established distance falls within a specified threshold; and
  performing an intersection detection analysis when the established distance is within the specified threshold.

16. The computer-implemented method of claim 15, wherein the intersection detection analysis comprises determining at least one intersection and at least one contact surface between the first component and the second component.

17. The computer-implemented method of claim 15, wherein the specified threshold is between 0.1% to 1.0% the length of a triangle.

18. One or more computer-readable memories storing computer-executable instructions that, when executed on one or more processors, perform acts comprising:
  using a deformation framework to achieve a user desired deformation of a model comprising an arbitrary mix of one or more rigid links and one or more soft links, the deformation framework comprising:
    a joint analysis application, wherein the joint analysis application maps one or more degrees of freedom to a corresponding joint type; and a joint-aware deformation application.

19. The one or more computer-readable memories of claim 18, wherein the joint analysis application is based at least in part on an intersection surface detection, a slippable motion analysis, a range of motion detection, and a mapping of an allowable degree of freedom to one or more joints.

20. The one or more computer-readable memories of claim 18, wherein the joint-aware deformation application comprises a non linear optimization problem.

21. The one or more computer-readable storage device of claim 20, wherein the non linear optimization problem utilizes a Gauss-Newton method.

* * * * *